Aug. 23, 1949. J. LLOYD ET AL 2,480,036
AIRPLANE WITH BOUNDARY LAYER CONTROL AND POWERED
BY INTERNAL-COMBUSTION TURBINES
Filed Nov. 13, 1946 2 Sheets-Sheet 1
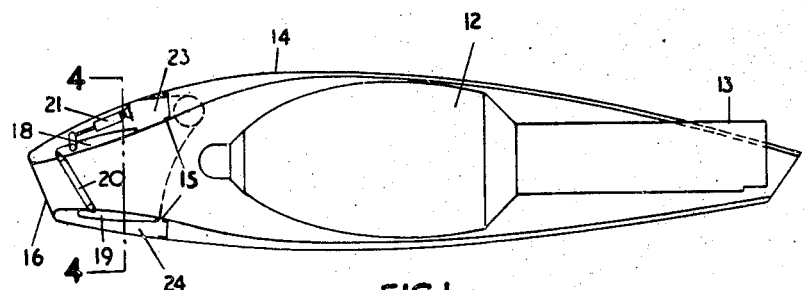
FIG.I.
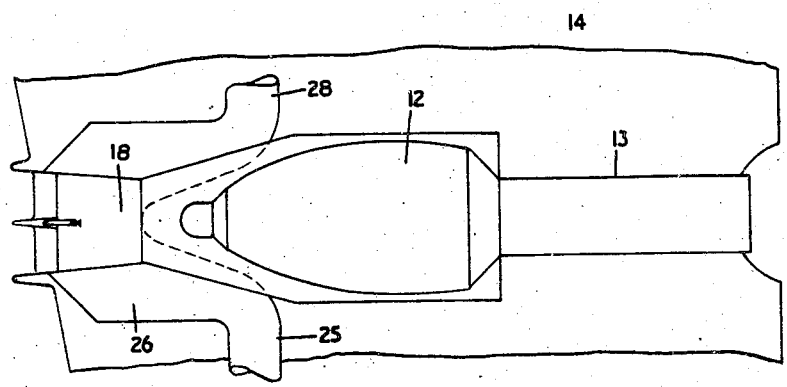
FIG. 2.
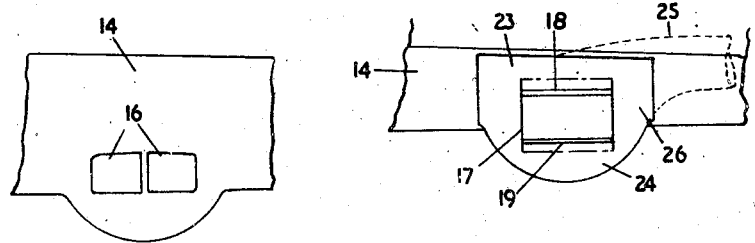
FIG.3.   FIG.4.
INVENTORS
John Lloyd
Clifford V. Murray
by Mawhinney & Mawhinney
Attorneys

UNITED STATES PATENT OFFICE 2,480,036

AIRPLANE WITH BOUNDARY LAYER CONTROL AND POWERED BY INTERNAL-COMBUSTION TURBINES

John Lloyd and Clifford V. Murray, Coventry, England, assignors to Sir W. G. Armstrong Whitworth Aircraft Limited, Coventry, England Application November 13, 1946, Serial No. 709,550 In Great Britain May 13, 1946

1 Claim. (Cl. 244—40)

This invention relates to an aircraft of the kind which is powered by an internal-combustion turbine unit (operating with jet or propeller propulsion, preferably the former), and particularly to such an aircraft of which the wings are swept back to a very material extent, as is now found to be advantageous if very high speeds are to be reached. In particular the leading edges of the wings should be swept back to an extent of 40° or 45° or even more for the highest speeds.

With such an aircraft, however, there is a tendency for "tip stall" to occur in certain conditions, particularly when the pilot's joy-stick or other main control member is pulled "fully back" to give maximum elevation.

It is the main object of the invention to reduce this tendency in a very simple manner.

According to one feature of the invention the intake for the power unit is along a stream-lined passage of appropriate cross-section (i. e., it need not be circular), and there is combined therewith a shutter means normally forming part of the wall of the passage but movable to a position to block the intake passage partially, so as to cause a relative depression therein, and to connect with the said depression a passage in the wing leading to an appropriate opening in the upper surface of the wing near the wing tip, whereby air will be drawn in from this portion of the upper surface of the wing, partly by the relative depression and partly by the suction of the power unit, when the shutter means is so moved from its normal position.

The term "relative depression" is used herein to mean that the pressure at that place will be less than the pressure on the upper surface of the wing near the wing tip.

In this way, by removing some of the boundary layer on the upper surface of the wing tip one can reduce the tendency for the wing tip to stall, i. e., one can reduce the tendency for "separation" to take place, and without making use of any auxiliary motor-driven fan or the like for the purpose, which would be uneconomical. Furthermore, one can ensure that the turbine receives a sufficient input of air.

The invention further involves providing such a power unit in each wing, each having a streamlined intake passage and having oppositely-disposed shutters normally forming part of the wall of the intake passage but movable to a position to block the intake passage partially, so as to cause a relative depression therein, and to connect with the said depression a passage or a pair of passages in the associated wing leading to an appropriate opening in the upper surface of the wing near the wing tip, as aforesaid.

In carrying out the invention it is preferred that the shutter means should be automatically movable from the normal position when the main control member is pulled fully back. In particular, the shutter means should be automatically movable from the normal position by different amounts dependently upon whether only the control member is moved from an intermediate position to the fully-back position, or only the throttle or other main power unit control is moved from an intermediate position to the shutdown position, or whether both these two are simultaneously so moved.

Due to the great loads on the shutter means it is advisable that it should be actuated by a servo means, and, in the case of a hydraulic servo means, a safety valve may be provided which can open in extreme conditions—as, for example, when the aircraft is suddenly put into a dive whilst the shutter means is not in the normal position, thereby allowing the automatic return of the shutter means, substantially instantaneously, to the normal position by the very high pressure of the air in the intake passage.

In this simple manner the peak of the lift curve can be raised, thus to offer a greater margin of safety to the pilot against inadvertently stalling his aircraft.

In the accompanying drawings, which are rather diagrammatic:

Figure 1 is an outline view of a section of an aircraft wing having a jet-propulsion internal-combustion turbine unit installed therein, and having the intake passage fitted with shutters arranged to reduce the tendency for "tip stall" to take place, in accordance with the invention;

Figure 2 is a fragmentary plan thereof;

Figure 3 is a fragmentary front elevation;

Figure 4 is a cross-section, taken mainly on the line 4—4 of Figure 1; and

Figure 5:
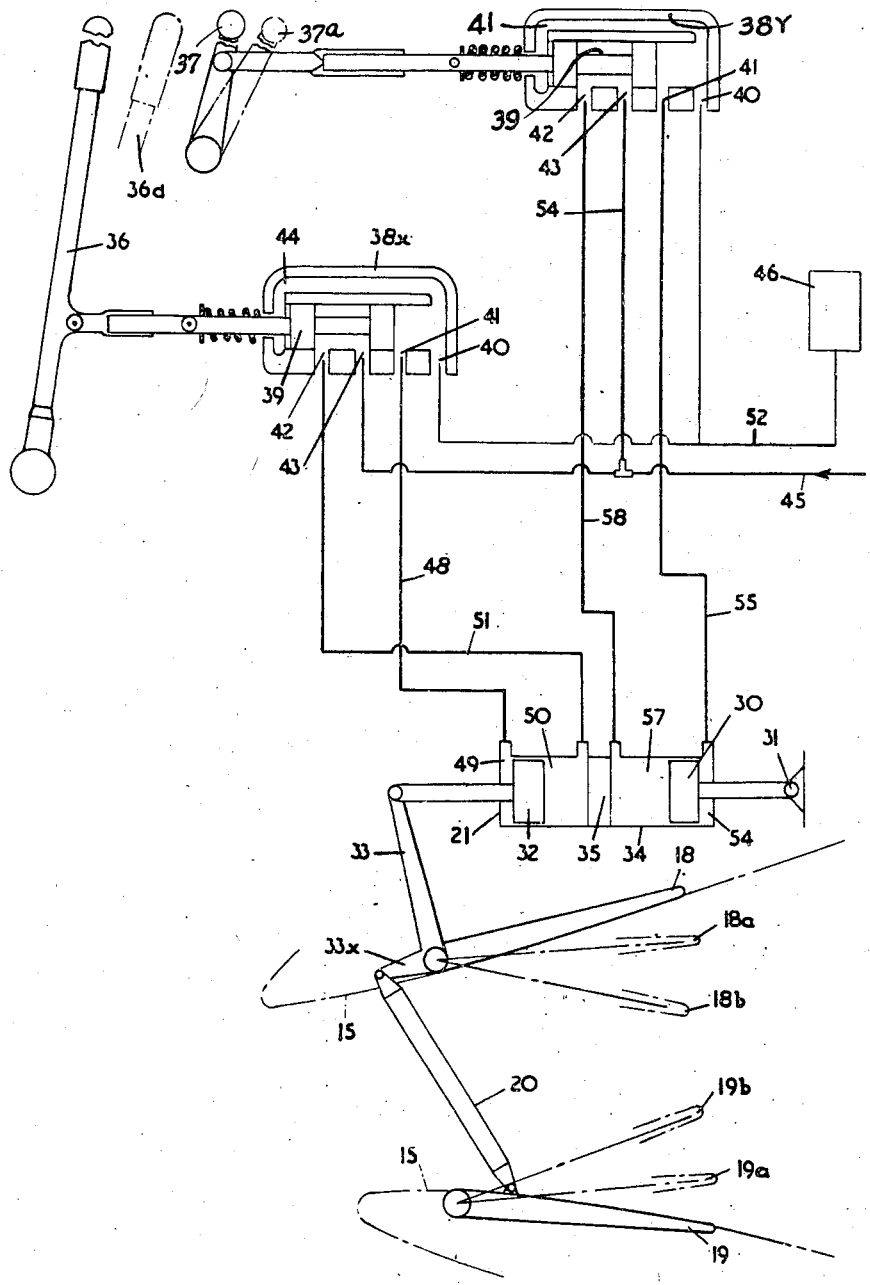
Figure 5 shows one arrangement in which the shutters are actuated jointly by the pilot's joystick and by the throttle lever through a power servo means.

Referring to the drawings, 12 indicates an internal-combustion turbine unit having a jet duct 13 extending to the trailing edge of the wing 14, within which the unit is disposed. The intake passage is bounded by upper and lower "streamline" walls 15. At its inlet end the intake passage comprises two substantially rectangular openings 16 (Figure 3), and further inwardly it is still of rectangular shape, as indicated at 17 in Figure 4, where it is bounded by upper and lower shutters 18, 19 which are inter-connected with one another, as shown at 20, so that when the jack 21, associated with one of the shutters (the upper shutter 18 in Figure 1), is actuated, the trailing edges of the shutters will be moved inwardly.

Figure 5 shows the shutters in the normal position in full lines. 18a, 19a indicate the positions of the shutters when either the joy-stick or the throttle lever is pulled "fully back," though, of course, these indications are intended to be approximate only. 18b and 19b indicate the positions of the shutters when both the joy-stick and the throttle lever are "fully back" simultaneously.

From Figure 4, particularly, it will be seen that outside the shutters there are upper and lower spaces 23, 24 which connect with a passage 25 by a side space 26. This passage 25 passes internally of the wing towards the wing tip, where it is connected with an elongated spanwise or other appropriate opening in the upper surface of the wing at a place where it will be desirable to suck in air, in order to increase the coefficient of lift of the wing tip and thus prevent the tendency for "tip stall" to take place.

It is intended that the aircraft in question (which, as stated, should have wings which are materially swept back, for maximum speeds, and which may be of the tailless or flying wing type), should have an internal-combustion turbine unit installed in each wing symmetrically on opposite sides of the centre-line of the aircraft. Figure 2 shows a second passage 28, leading from the spaces 23 and 24 outside the shutters, which is connected to a corresponding opening provided in the upper surface of the other wing of the aircraft, near the tip thereof. Both turbine units are so arranged, so that in case one of them should fail the remaining one will, in the appropriate conditions, serve for removing the boundary layer from the upper surface of the wings adjacent both the wing tips.

When the shutters are moved inwardly, as disclosed by the chain lines 18a and 19a or 18b and 19b in Figure 5, a depression will occur in the intake passage at the trailing edges of the shutters, and it is, it will be observed, the area of this depression which is connected to the upper surface openings near the wing tips. Not only does this depression assist in drawing in the boundary layer, but the latter is, in addition, more positively sucked in by the action of the compressors of the turbine units.

Referring now to Figure 5, this shows a composite jack 21 comprising a stationary plunger 30, which is, in point of fact, pivotally mounted at 31, a movable plunger 32 hinged to an arm 33 fast with the upper shutter 18, the arm 33 having a cranked extension 33x connected to the link 20, and a slidable casing or cylinder 34 having fast in it a barrier or partition 35. The joy-stick 36 is shown in an intermediate position in full lines, and at 36a in its fully-back position. In like manner, the throttle lever 37 is shown in full lines in the cruising position, and at 37a in the shutdown position.

38x is a stationary casing of a servo valve member 39 connected to be actuated by the joy-stick. In the actual position shown, the port 40 is in communication with the port 41, and the port 42 with the port 43. When the joy-stick is pulled fully back, the associated valve member 39 is moved to its other position, and the port 40 will then be in communication, by way of the passage 44, with the port 42, and the ports 41 and 43 will be directly in communication with one another.

The throttle lever 37 is connected to the movable element of a servo valve casing 38y, and this valve and the associated portions are all given the same reference characters as those applied to the valve connected to be actuated by the pilot's joy-stick.

The arrow 45 represents a source of fluid supply under pressure, and 46 represents a header tank.

With the parts in the positions shown by full lines, if the joy-stick be moved to the position 36a to throw the associated movable valve 39 to its other position, pressure is supplied from the source 45, by way of ports 43, 41, along the pipe line 48 to the left-hand end 49 of the servo cylinder 34, and the space 50 on the other side of the plunger 32 is placed to exhaust by way of the pipe line 51, the ports 42 and 40, and the pipe line 52. The plunger 32 is, therefore, moved to the right towards the partition 35 of the servo cylinder, and the shutters are moved to the positions 18a and 19a respectively, or to nearby positions.

Alternatively, if, instead of the joy-stick being moved from the position 36 to the position 36a, the throttle lever 37 be moved to the position 37a, then the source of pressure supply 45 will be connected by way of the pipe line 54, the ports 43, 41, and the pipe line 55, to the right-hand end 56 of the servo cylinder, and this will be moved to the right as a whole relatively to the fixed plunger 30, drawing with it the plunger 32, so as to move the shutters from the positions 18, 19 to 18a, 19a respectively, or to nearby positions, whilst the space 57 between the fixed plunger 30 and the partition 35 is placed to exhaust by way of the pipe line 58, the ports 42, 40, and the pipe line 52.

Obviously, by providing for different strokes of the plungers 30, 32 with respect to the servo cylinder 34, the shutters 18, 19 can be moved, in unison, inwardly to different extents, depending upon whether they are being moved in response to the action of the joy-stick or the throttle lever.

Furthermore, it will be evident that if both the joy-stick and the throttle lever are moved to the "fully-back" positions at the same time, then both the above-traced movements will be simultaneously applied to the servo jack, with the result that the shutters 18, 19 will be moved inwardly to a greater extent, e. g., to the positions indicated at 18b, 19b, in which the depression in the intake passage is a maximum, and a maximum quantity of the air required to feed the turbine unit will be drawn in from the upper surface openings provided adjacent the wing tips.

What we claim as our invention and desire to secure by Letters Patent of the United States is:

An aircraft having a wing, an internal-combustion turbine unit carried by the wing, means providing a stream-lined intake passage for said wing, said means extending from an exterior surface of the aircraft to said unit and including a wall, a shutter means normally forming a part of the wall of said intake passage but movable to a position to partially block said passage so as to cause a relative depression in the pressure of the fluid in said passage downstream of said shutter means, a main control member for the aircraft, a main control member for said unit, connecting means between both of said control members and said shutter means, means in said wing providing a passage between an opening in the upper surface of the wing near the wing-tip and an opening in the wall of said intake passage, which last named opening is normally closed by said shutter means but which is uncovered, when said shutter means is moved as aforesaid, to place that portion of said intake passage which is downstream of said shutter means in communication with said wing-tip opening whereby to remove some of the boundary layer from the upper surface of the wing-tip, said connecting means including means independently and additively responsive to displacements of the respective control members for effecting corresponding displacements of said shutter means, whereby displacement of either one of said control members and displacement of both said control members will produce, respectively, movement of said shutter means through a portion of its travel path and movement of said shutter means through its total travel path.

JOHN LLOYD.
CLIFFORD V. MURRAY.

REFERENCES CITED

The following references are of record in the file of this patent:

UNITED STATES PATENTS

| Number | Name | Date |
|---|---|---|
| 1,986,064 | Leary | Jan. 1, 1935 |

FOREIGN PATENTS

| Number | Country | Date |
|---|---|---|
| 479,598 | Great Britain | Feb. 7, 1938 |